ARTHUR J. LEARN
RUEBEN S. SPRIGGS
FREDERICK W. SCHMIDLIN
*INVENTORS.*

BY Jerry A. Dinardo
George C. Thompson
AGENTS.

Jan. 7, 1964 A. J. LEARN ETAL 3,117,025

THIN FILMING APPARATUS

Filed Aug. 31, 1961 4 Sheets-Sheet 2

ARTHUR J. LEARN
RUEBEN S. SPRIGGS
FREDERICK W. SCHMIDLIN
*INVENTORS.*

BY Jerry A. Dinardo
Roy C. Thompson Jr.
AGENTS.

THIN FILMING APPARATUS

Filed Aug. 31, 1961 4 Sheets-Sheet 3

ARTHUR J. LEARN
RUEBEN S. SPRIGGS
FREDERICK W. SCHMIDLIN
*INVENTORS.*

BY Jerry G. Dinardo
George C. Thompson Jr.
AGENTS.

THIN FILMING APPARATUS

Filed Aug. 31, 1961 4 Sheets-Sheet 4

ARTHUR J. LEARN
RUEBEN S. SPRIGGS
FREDERICK W. SCHMIDLIN
*INVENTORS.*

BY Jerry A. Dinardo
George C. Thompson
AGENTS.

3,117,025

THIN FILMING APPARATUS

Arthur J. Learn, Torrance, Rueben S. Spriggs, East View, and Frederick W. Schmidlin, Portuguese Bend, Calif., assignors to Space Technology Laboratories, Inc., Los Angeles, Calif., a corporation of Delaware Filed Aug. 31, 1961, Ser. No. 135,350
6 Claims. (Cl. 118—49)

This invention relates to apparatus for fabricating thin films and particularly to apparatus designed to form thin film elements into precise patterns that make them useful as electronic components.

Thin film superconductive elements are receiving increased attention in the design of high speed, miniaturized components. A superconductive element, in its simplest form, consists of a body of superconductive material, usually in thin film form, disposed between a pair of terminals. One of the most useful properties of a superconductive material is that it exhibits no measurable electrical resistance below a certain critical temperature close to absolute zero. It is also known that a transition from a superconducting to a resistive state can be induced in a superconductor by applying a magnetic field to the superconductor. The magnetic field can be applied externally to the superconductor, or it can be induced internally by the flow of electric current through the superconductor. In the presence of an external magnetic field, a superconductor requires less directly applied electric current, termed the critical current, to cause a transition than it does when there is no external magnetic field present. Many of the electrical characteristics of a superconductive element are found to be critically dependent on the physical dimensions of the element.

One form of superconductive circuit component, such as a thin film cryotron, may comprise several superposed layers of thin film elements, some of which are superconductive, and others insulating. It has been found practicable to employ a vacuum deposition process for fabricating cryotrons, by successively vapor depositing the various elements as coatings on a substrate through different suitably configured apertured masks and from different vapor sources. To avoid damaging the previously deposited elements, the masks must not contact the coated surfaces of the substrate but must be closely spaced therefrom. As a result of the spacing of the mask from the substrate, a penumbra is produced at the edges of the elements. Penumbra formation is particularly undesirable along the critical dimensions, especially the width, of the superconductive elements, since it makes it difficult to control the dimensions of the elements within the fine tolerances necessary to give them the precise electrical characteristics required.

The width of the penumbra is determined by the geometry of the system comprising the vapor source, the mask, and the substrate. Specifically, the width of the penumbra is equal to the product of the source width times the mask-to-substrate spacing, divided by the source-to-mask spacing. The penumbra can be reduced by reducing the size of the vapor source and the mask-to-substrate spacing, and by increasing the source-to-mask spacing. However, while the vapor source can be reduced to some small physical size, there is a phenomenon which occurs in the immediate vicinity of the source which makes the latter appear as a virtual or effective source of a size considerably larger than the actual source size. The phenomenon referred to is believed to originate from collisions between the vapor particles issuing from the source, which deflect and disperse the particles in many different angular directions, thereby giving the effect of the particles having been emitted from a much larger source. As used herein, vapor particles refer to particles of atomic dimensions.

Accordingly, an object of this invention is to minimize the formation of penumbra in the production of thin film elements of desired configurations.

Another object is to provide an improved apparatus for fabricating thin films in precise, easily controllable patterns.

According to one aspect of the invention, a collimating element which may take the form of a disc provided with a fine slit, is interposed between and aligned with the vapor source and the mask. The combination of the two apertures provided in the collimating element and the mask constitutes a collimating means for defining the effective path of the vapor particles. The width of the slit and its position relative to the vapor source and mask is such as to let through the mask aperture only those vapor particles that are confined within a relatively narrow beam. The geometry of the system is such as to reduce the effective width dimension of the vapor source as viewed on the substrate surface to approximately the physical dimension thereof. By reducing the effective width of the vapor source, the penumbra is reduced.

According to another aspect of the invention, the side walls of the slit in the collimating element as viewed in section through its width are inclined at such an angle as to be out of the line of sight of the vapor source. Consequently, reflections of vapor particles from the side walls of the slit are practically eliminated, thereby avoiding an enlargement of the vapor beam in the regions of the vapor source and the penumbra that would have resulted therefrom.

According to still a further aspect of the invention, means are provided for carrying on simultaneous depositions on several substrate areas from a single vapor source, by means of a plurality of discrete vapor beams, with each substrate area receiving vapor particles only from its own narrowly defined vapor beam. This is accomplished by providing a plurality of masks, one for each substrate area, and interposing a second collimating element between the first collimating element and the masks.

Figure 8:
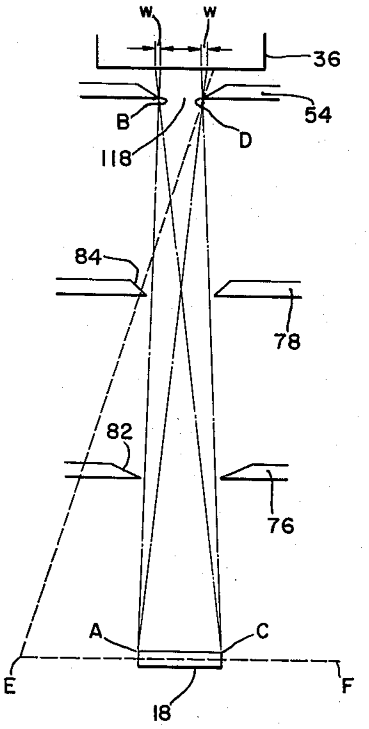
Figure 9:
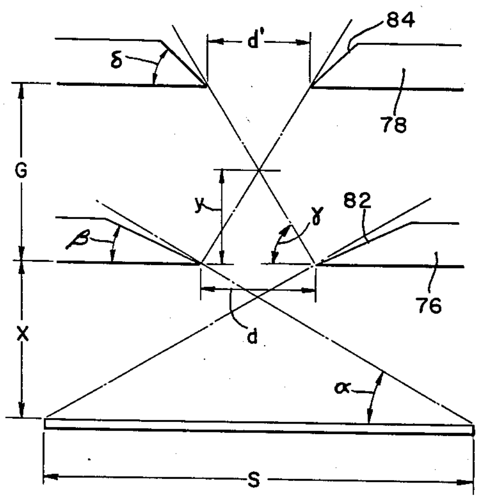
Figure 7:
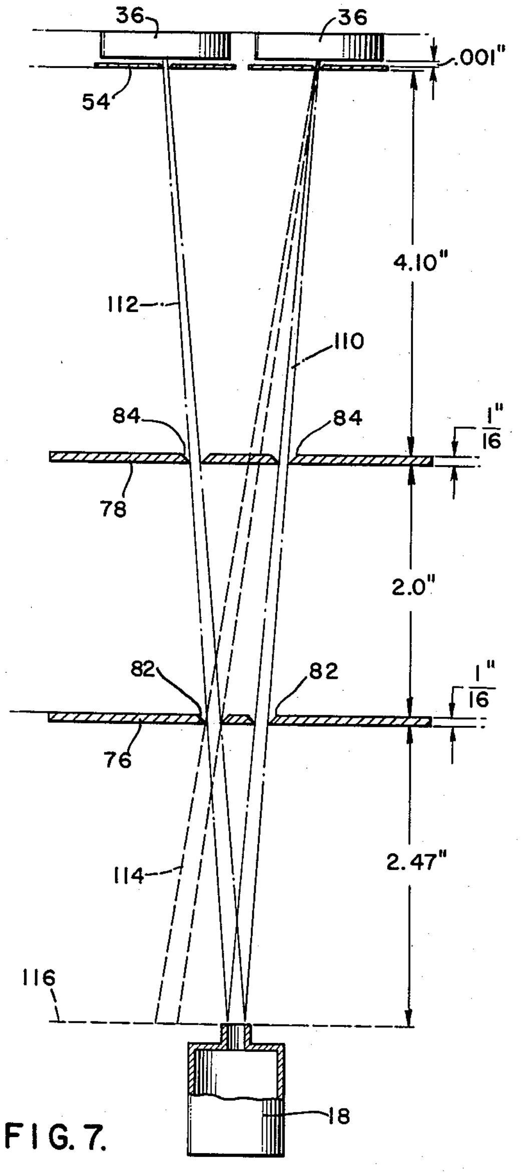
Figure 10:
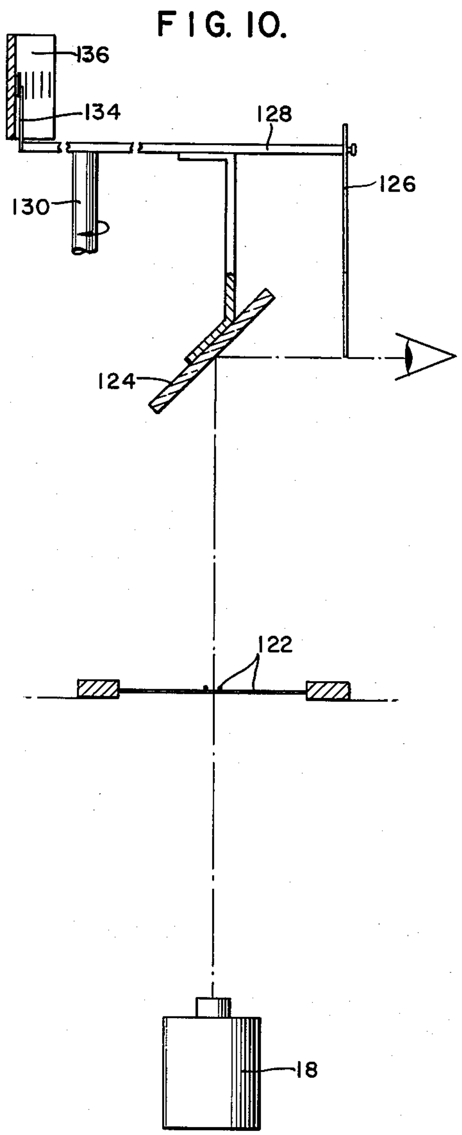
Figure 11:
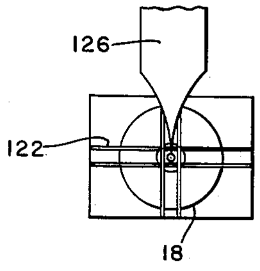

FIGS. 7, 8, and 9 are diagrams useful in explaining the operation of the invention; and FIGS. 10 and 11 are diagrams showing an alignment means for the apparatus of the invention.

Figures 1, 4, 5:
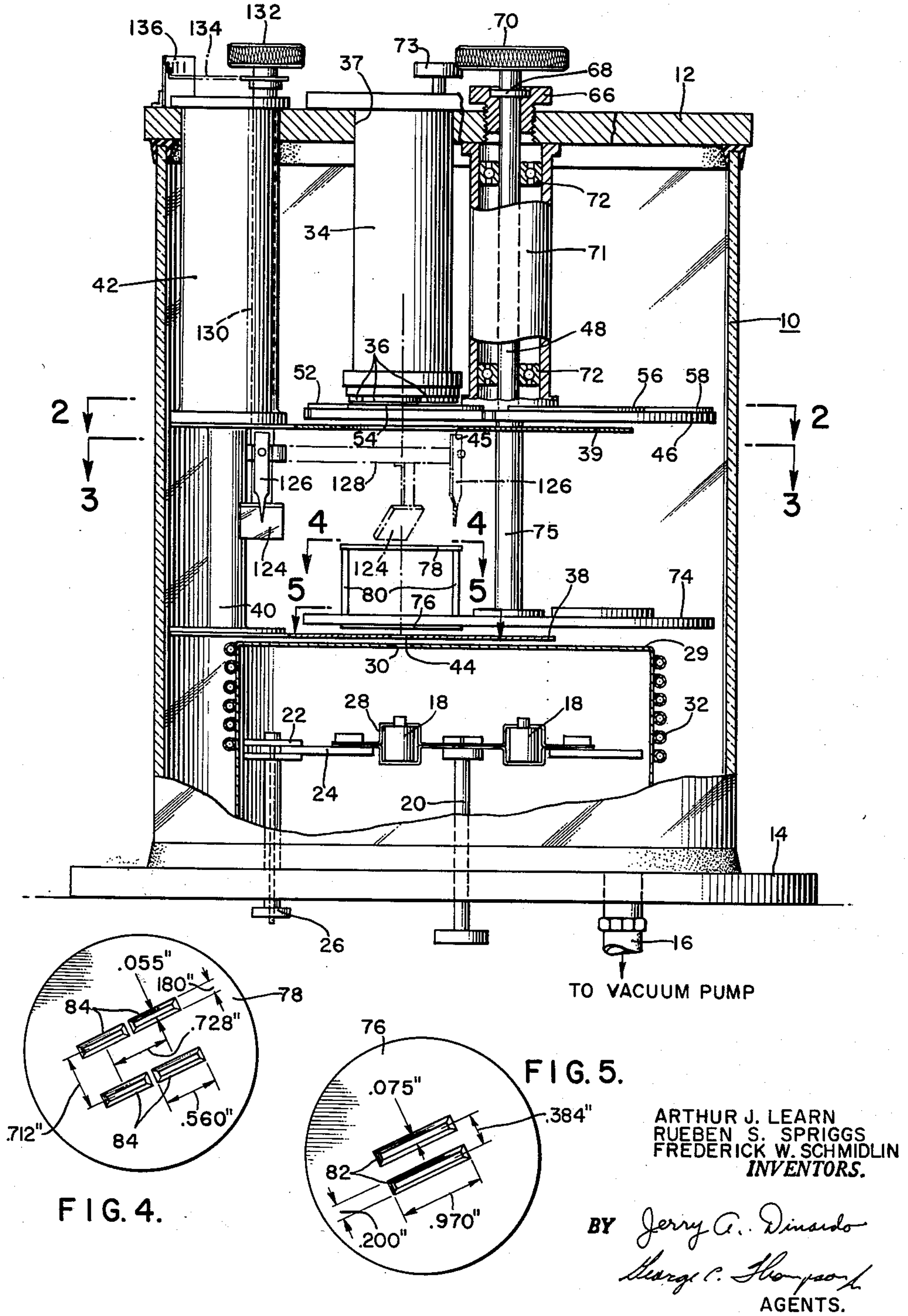
FIG. 1 is a front elevation view of a thin-filming apparatus according to the invention.
FIG. 4 is a section along line 4—4 of FIG. 1.
FIG. 5 is a section along line 5—5 of FIG. 1.

Referring to FIG. 1, there is shown one form of vacuum deposition apparatus constructed according to the invention. The apparatus includes a cylindrical vacuum chamber 10 closed at its upper end by a top plate 12 and at its lower end by a bottom plate 14. The vacuum chamber 10 is evacuated through a conduit 16 leading out of the bottom plate 14 and connected to a vacuum pump, not shown.

Within the lower half of the chamber 10 is disposed an evaporator assembly including a plurality of vapor sources 18 mounted for rotation on a rotatable shaft 20. The vapor sources 18 may be selectively rotated into desired position on a horizontal plane by means of a knob fixed to the rotatable shaft 20. The selected vapor source 18 is fixed in position by means of a clamp 22, which engages an electrical bus bar 24 supporting the source 18. The clamp 22 is operable by a knob 26. The vapor sources 18 are electrically heated by means of strip conductors 28 which surround the sources 18, the strip conductors 28 receiving current from an electrical source, not shown, connected between the shaft 20 and the clamp 22. The vapor sources 18 may contain different vaporizable materials that are used for fabricating thin film cryotrons. Among the materials that may be used are superconductive materials such as lead, tin, and indium, as well as insulating material such as silicon monoxide.

A cylindrical metal shield 29, provided with an opening 30 at the top to permit passage of vapors from the vapor sources 18, surrounds the evaporator assembly. The shield 29, which is surrounded by water-cooled pipes 32, helps to prevent the radiant energy emitted by the vapor sources 18 during heating thereof from falling on the walls of the chamber 10 and other surrounding structure and causing the evolution of gas impurities.

Within the upper half of the chamber 10 is disposed a support cup 34 for holding a plurality of substrates 36 to be coated. The substrates 36, which may comprise glass or quartz discs, are loosely cemented or otherwise fixed to the bottom surface of the cup 34 so that they can be removed from the cup 34 when the coating process is completed. The cup 34 is mounted in an opening 37 in the top plate 12 so that the inside of the cup 34 is open to the atmosphere, whereas the outside of the cup 34 is disposed within the chamber 10. The cup 34 holds a quantity of coolant, such as liquid nitrogen, for maintaining the substrates 36 at reduced temperature during the metalizing process. In addition, an electric heater coil, not shown, may be positioned in the bottom of the cup 34 so as to maintain the substrates 36 at elevated temperature during the deposition of other coating material, such as insulation material.

Ordinary vacuum pumps are capable of providing a vacuum on the order of $5 \times 10^{-6}$ millimeters of mercury. However, considerably lower pressures than this are required to vacuum deposit thin film elements which are of the required purity to insure reproducible superconductive properties. In order to reduce the vacuum pressure to the required low amount, a pair of cold trap metal plates 38 and 39, spaced apart and joined by an extension member 40, are mounted between the substrates 36 and the cylindrical shield 29. The trap plates 38 are supported by a second cup 42 to which the upper trap plate 39 is joined in good thermal contact. The second cup 42 may contain a coolant such as liquid nitrogen to maintain the temperature of the second cup 42 and the trap plates 38 and 39 at about 77° Kelvin. The trap plates 38 and 39 each have central openings 44 and 45, respectively, to permit the flow of the desired evaporated material from the vapor source 18 to the substrates 36. Since the trap plates 38 and 39 are maintained at a very low temperature, they serve as an additional pump for vapors which are condensable thereon at the temperature of the coolant. Such vapors may be components of the residual gas in the vacuum system or may be vapors that are evolved during the filming process.

Figure 2:
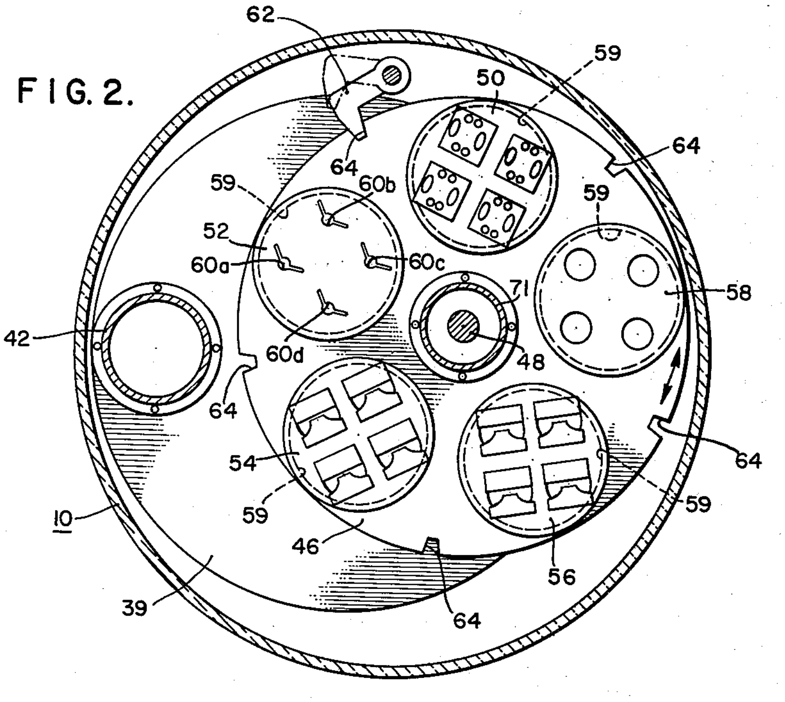
FIG. 2 is a section along line 2—2 of FIG. 1.

A circular mask support plate 46 fixed to a rotatable shaft 48 extending through the top plate 12 supports a plurality of multi-apertured masks 50, 52, 54, 56, and 58 as shown more clearly in FIG. 2. The masks are mounted in apertures 59 in the support plate 46. Each of the masks 50–58 is suitably configured so that when a selected mask is rotated into position adjacent the substrates 36, a suitable film pattern may be deposited on each of the substrates 36 from the vapor material issuing from a selected vapor source 18. As illustrated, each mask 50–58 is formed with four mask openings, as exemplified by the areas *60a*, *60b*, *60c*, *60d*, so that four substrates can be coated simultaneously during a given evaporation step. In order to place each mask 50–58 in the same position under the substrates 36, an indexing mechanism is associated with the mask support plate 46. The indexing mechanism comprises a pivotable dog 62, which can be moved to engage any one of five notches 64 equally spaced about the periphery of the mask support plate 46.

Referring again to FIG. 1, the mask support plate 46 may be raised into position or lowered out of position by means of a nut 66 threaded in the top plate 12 and engaging a collar 68 on the rotatable shaft 48. A knob 70 fixed to the end of the shaft 48 serves to rotate the masks 50–58 into position. A cylindrical member 71 attached to the top plate 12, surrounds the shaft 48. The member 71, provided with bearings 72, serves to guide the shaft during vertical movement and prevents lateral movement thereof during rotation. Another knob 73 controls movement of the dog 62 for indexing.

Figure 3:
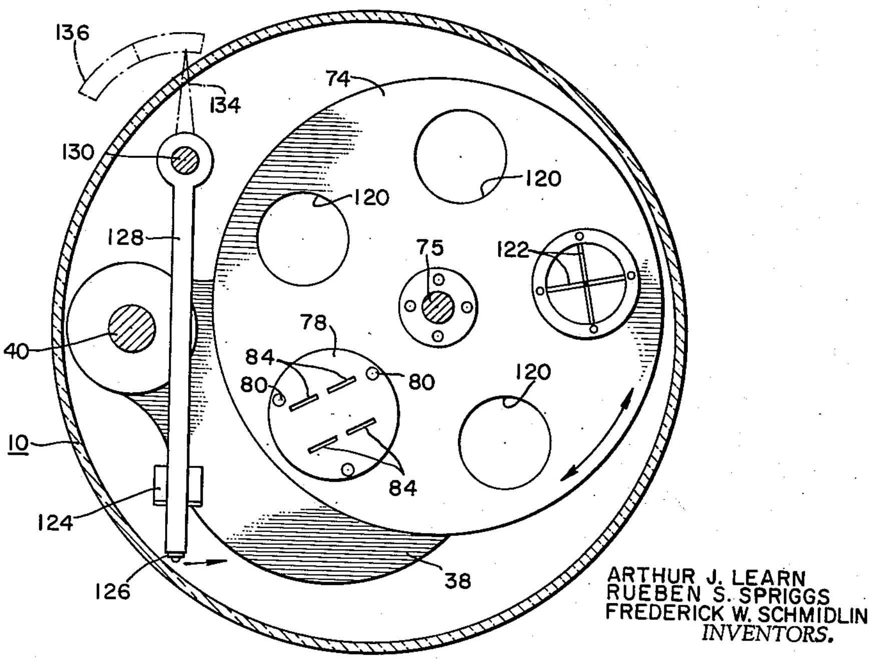
FIG. 3 is a section along line 3—3 of FIG. 1.

Referring to FIGS. 1 and 3, a second or lower support plate 74 is fixed to an extension 75 of the rotatable shaft 48 so that both plates 46 and 74 can be rotated together. The lower support plate 74 supports a pair of collimating elements 76 and 78 spaced from each other by pins 80. As shown more clearly in FIGS. 4 and 5, each of the collimating elements 76 and 78 takes the form of a metal disc provided with spaced parallel slits, the collimating element 76 nearest the vapor sources 18 having two slits 82 and the other collimating element 78 having four slits 84. Each of the slits 82, 84 has an opening that is tapered when viewed as a section through its width. The collimating slits 82 and 84, the apertures of a selected mask 54, and the substrates 36 are all aligned with the particles vapor source 18 being used at any given time. As will be explained in more detail, the collimating slits 82 and 84 serve to shape the vapor stream into a plurality of discrete, narrow angle vapor beams.

Figure 6:
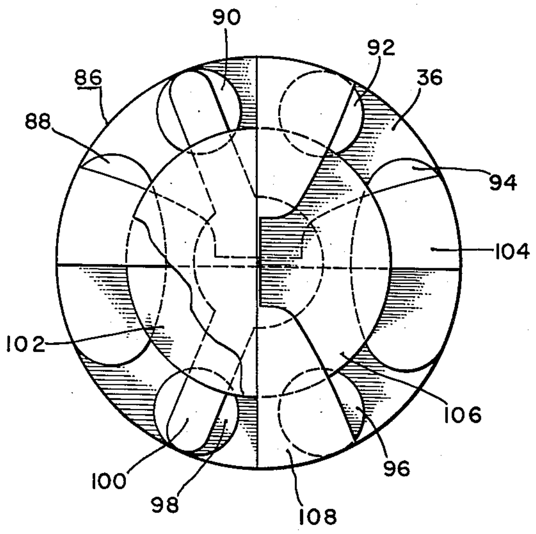
FIG. 6 is an enlarged plan view of a thin film cryotron.

FIG. 6 shows a thin film cryotron 86 of the kind that may be formed on each of the substrates 36. In fabricating the cryotron 86, a plurality of superconductive contacts 88, 90, 92, 94, 96, and 98 are first formed on each substrate 36 by evaporating through the mask 50 (FIG. 2). Next, a superconductive ground plane coating 100 is formed on the substrate 36 by means of the mask 52, with the coating 100 conductively connected with the contacts 90 and 98. The coating 100 is covered with an insulation coating 102 by means of the mask 58. On top of the insulation coating 102 is deposited a relatively wide superconductive gate element 104 by means of the mask 56, with the gate element 104 conductively connected with contacts 88 and 94. The gate element 104 is coated with an insulation coating 106, with the use of the mask 58. On top of the insulation coating 106 is finally deposited a relatively narrow superconductive control element 108 by means of the mask 54, with the control element conductively connected to the contacts 92 and 96.

Both the gate and control elements 104 and 108 must be uniform in width and thickness in order that their electrical characteristics be well defined. Furthermore, it is desirable that elements 104 and 108 be reproducible with the same characteristics. It is quite important, therefore, to avoid the formation of penumbra along the lengths of the elements 104 and 108. Towards this end, and referring to FIG. 7, during fabrication of either the control element 108 or the gate element 104 the collimating elements 76 and 78 are disposed between the mask 54 or mask 56 and the vapor source 18. For simplicity, while only one set of collimating elements 76 and 78 is shown, and this set is associated with the mask 54 for forming control elements, it is understood that another set of collimating elements may be provided in association with the mask 56 for forming gate elements. The collimating elements 76 and 78 are arranged at the proper spacing relative to the mask 54 and the vapor source 18, and the widths of the slits 82 and 84 are suitably designed so that only a narrow beam 110 of vapor particles will strike each substrate 36. To carry out an evaporation on a single substrate, only two apertures are required, namely, one provided by a mask and one provided by a single collimating element 76, in order to confine the vapor beam 110 or 112 in such a way that the substrate 36 sees a vapor source 18 of an effective size approximating the size of the actual source 18. Where evaporation is carried on simultaneously from a single source 18 to a plurality of substrates 36, however, it is important to assure that each substrate 36 sees only its own well defined beam 110 or 112 and that it not receive vapor particles from many angular directions. This is accomplished by adding a second collimating element 78 between the first collimating element 76 and the mask 54. It will be seen that in the absence of the second collimating element 78, the substrate 36, on the right of FIG. 7, would receive vapor particles not only from its own beam 110 but also would receive particles arriving from a vapor beam 114 along a different direction and emanating from a virtual source 116, that is a source much larger than the actual vapor source 18.

A fuller understanding of the action of the collimating elements 76, 78 may be had by reference to the diagrams of FIGS. 8 and 9, parts of which are enlarged for clarity of description. Ideally, the boundaries of the vapor beam, for minimum penumbra formation, should be defined by the width of the mask opening 118 and the actual width of the vapor source 18, as exemplified by the ray lines $\overline{AB}$ and $\overline{CD}$ of FIG. 8. That is, all vapor atoms arriving at the substrate 36 should be traveling along paths which extrapolate back to points lying within the physical dimensions of the vapor source 18. Under these circumstances, the width $w$ of the penumbra at the substrate 36 is defined by the projection of intersecting lines $\overline{AB}$ and $\overline{CB}$ or $\overline{CD}$ and $\overline{AD}$ drawn from the extremities of the vapor source 18 through an edge of the mask opening 118. The penumbra, as defined by the width $w$, is nonuniform in thickness because all points on the substrate 36 within the width $w$ do not see the entire area of the vapor source 18. On the other hand, all points on the substrate 36 defined by the lines $\overline{AB}$ and $\overline{CD}$ do see the entire area of the vapor source 18, so that the thickness of the film deposited in this central area is of the desired uniformity in thickness. If the vapor stream behaved in this ideal manner, the penumbra would be minute even for a finite mask-to-substrate spacing and could therefore be tolerated.

However, because of collisions between the vapor particles in the immediate vicinity of the vapor source 18, some of the vapor particles move towards the substrate 36 at angles such that they appear as having issued from a much larger source, such as the virtual source of width EF. Thus a vapor particle traveling along a line $\overline{ED}$ in the absence of collimating elements, would strike the substrate 36 at some point beyond the width $w$ and a much wider penumbra would be formed. In order to reduce the size of this virtual source EF to an effective size approximating that of the actual source 18, the collimating elements are interposed between the source 18 and the mask 54. Ideally, the slits 82 and 84 of the collimating elements 76 and 78 should coincide with lines $\overline{AB}$ and $\overline{CD}$. However, since it is difficult in practice to achieve perfect registration between the source 18, the collimating elements 76 and 78, and the mask opening 118, the collimating slits 82 and 84 are made somewhat wider than this. Consequently, it is assured that the resulting wider vapor beam will fill the mask opening 118 even when there is not perfect registration. Under these circumstances, the effective size of the source 18 will be reduced by the collimating elements 76 and 78 from a size that is one or two orders of magnitude larger than that of the actual source size to one that is no more than two or three times the actual size. In order to reduce the effective source size to a minimum, the first collimating element 76 is preferably placed as close as possible to the source 18. The farther away it is spaced from the source 18, the greater will be the extent of the effective source seen by the substrate 36. However, the first collimating element 76 must be placed at least a sufficient distance from the source 18 as to be out of the regions where significant vapor particle collisions occur.

An important feature of the collimating elements 76 and 78 is that the slits 82 and 84, as viewed in section through their widths, are tapered toward the source 18. The amount of taper is such that the surfaces of the slits 82 and 84 are not exposed to, that is, not in the line of sight of, the virtual source EF. The reason for not exposing the surfaces of the collimating slits 82 and 84 to the vapor particles appearing to emanate from the virtual source EF is to prevent these particles from impinging on and reflecting from these surfaces in such directions as to create other virtual sources in the vicinity of the collimating elements 76 and 78. By suitably shaping the slit surfaces, only those vapor particles that pass directly through both slits 82 and 84 are allowed to proceed towards the mask opening 118 as a fine beam, and all other vapor particles are deflected harmlessly away from the beam.

Reference is now made to the diagram of FIG. 9. While discussion will be limited to the case of a convergent vapor beam, that is, one in which the width of the source 18 is greater than the minimum width of the mask opening 118, and the minimum width of the first collimating slit 82 is greater than that of the second slit 84, the same results will apply to the case of a divergent beam. From the diagram, the following expression is obtained by simple plane geometry:

$$\tan \alpha = \frac{X}{(1/2)S + (1/2)d}$$

where X is the spacing between the first collimating element 76 and the source (which is considered the same for the actual or virtual source). S is the width of the virtual source (which can be calculated, as will be shown below), and $d$ is the minimum width of the first collimating slit 82. Thus, the angle of slope $\beta$ of the first collimating slit 82 must be less than the angle $\alpha$. It can be seen that the closer the spacing X between the source and the first collimating slit 82, the smaller must be the angle of slope $\beta$.

To determine the width S of the virtual source, an evaporation can be carried out without the use of the collimating elements 76 and 78. The width $w$ of the penumbra so formed is then measured. The width S of the vertual source is then calculated by the folowing:

$$w = \frac{S}{Z} z$$

where Z is the spacing between the mask 54 and the source 18, and $z$ is the spacing between the mask 54 and the substrate 36.

Considering the second collimating slit 84 having a minimum width $d'$, we get the following:

$$\tan \gamma = \frac{y}{(1/2)d}$$

but $$\frac{d}{y} = \frac{d'}{G-y}$$

so $$y = \frac{d \times G}{d+d'}$$

and $$\tan \gamma = \frac{2G}{d+d'}$$

Thus the angle of slope $\delta$ of the second collimating slit 84 must be less than $\gamma$.

A similar relationship defines the angle of slope of the mask opening 118, where G in the above expression becomes the spacing between the first collimating element 82 and the mask 54 and $d'$ becomes the minimum width of the mask opening 118.

According to one operational embodiment for fabricating thin film superconductive elements having a thickness of the order of a micron, a width of the order of .001″ and a length of about .5″, the dimensions were those shown in FIGS. 4, 5, and 7.

Since the width of a superconductive element may be quite small, as small as 30 microns, for example, it is quite important that the system comprising the vapor source, the collimating elements, and the mask be accurately aligned. A procedure for achieving accurate alignment will now be described. It will be noted in FIGS. 2 and 3 that the mask support plate 46 and the lower support plate 74 holding the collimating elements are provided with a number of large apertures, in this case, five. One of the five apertures in the mask support plate 46 is shown at 59, and three of the five apertures in the lower support plate 74 are shown at 120. The following steps are now carried out with the top plate 12 and the structure supported thereby, disassembled from the vacuum chamber 10. The two plates 46 and 74 are first assembled on the common shaft extension 75 so that the apertures 59 in the mask support plate 46 are aligned with the apertures 120 in the lower support plate 74. The masks 50–58 are then installed in the mask support plate 46 so that they are centered and oriented in the apertures 59, and so that when they are each rotated into a given position, each of the four mask openings of a given mask, such as the areas 60*a*–60*d* (FIG. 2), will be centered at the same four points.

A set of cross hairs 122 is then installed in one of the holes 120 in the lower support plate 74; it is centered in that hole and thus also centered with the mask 58 above it. The collimating elements 76 and 78 are loosely installed on the bottom plate 74.

A point light source, not shown, is then placed at a distance from the lower support plate 74 corresponding to the proper spacing for the vapor source 18, and it is adjusted laterally under the cross hairs 122 until it is centered with respect to the cross hairs 122 and the mask 58, by observing an image of the cross hairs 122 at the bottom center of the mask 58. The two support plates 46 and 74 are then rotated to place the collimating elements 76 and 78 in position above the point light source. The mask support plate 46 is then locked into position by engaging the dog 62 in a notch 64. The collimating elements 76 and 78 are then moved laterally until they are aligned with the slits of the mask 54 above them, such a state being achieved when an image of the collimating slits 82 and 84 is in coincidence with the mask slits.

Steps are now taken to facilitate the alignment of the vapor source 18 with the collimating elements 76 and 78 and the masks 50–58 when the top plate is assembled in the vacuum chamber 10. For this purpose a mirror 124 and pointer 126 arrangement is used, as shown in FIG. 1. The mirror 124 and pointer 126 are mounted at the end of an arm 128, fixed to a rotatable shaft 130, supported in the top plate 12 and actuated by a knob 132. The position of the mirror 124 and pointer 126 is indicated by the setting of a needle 134 on a scale 136. With the point light source still in position, the support plates 46 and 74 are indexed to place the cross hairs 122 over the point light source. The mirror 124 and pointer 126 are then positioned above the cross hairs 122 and an observation point is found where the image of the point light source is centered on the cross hairs 122. The pointer 126 is then moved relative to the arm 128 and adjusted so that it points on the point light source. The setting on the scale 136 is noted.

The top plate 12 is now assembled in the vacuum chamber 10. By moving the knob 132, the pointer 126 is reset to the scale setting noted above. The original angle of observation is found when the pointer 126 is seen to center on the cross hairs 122, as shown in FIGS. 10 and 11. The vapor source 18 is then moved until it is centered on the cross hairs 122. Accurate alignment between the vapor source 18, the collimating elements 76 and 78 and the mask 54, and between the vapor source 18 and any one of the remaining masks 50, 52, 56, and 58 is now assured.

It is now apparent that by means of the invention, penumbra formation can be minimized in the production of thin film elements, with the result that the electrical characteristics of thin film elements are easily controllable.

The embodiments of the invention in which an exclusive property or privilege is claimed are defined as follows:

1. Apparatus for accurately forming a thin film member of a desired pattern on a substrate, said apparatus comprising: a vacuum chamber, a vapor source mounted in one location within said chamber, said vapor source having a virtual width appreciably greater than its actual width, a substrate mounted in another location within said chamber, a masking member mounted between said substrate and said vapor source and spaced closely apart from said substrate, said masking member being provided with an opening conforming to the desired pattern of said thin film member, and a pair of collimating elements mounted between and mutually spaced from said vapor source and said masking member, each of said collimating elements being provided with a tapered opening aligned with said vapor source and said opening in said masking member, a first tapered opening nearest said vapor source having surfaces tapering toward said vapor source by an amount sufficient to dispose said surfaces of the first opening out of the line of sight of any point along the virtual width of said vapor source, and a second tapered opening nearest said masking member, masking member having surfaces tapering in the same direction as said first opening by an amount sufficient to dispose said surfaces of the second opening out of the line of sight of any point along the minimum width of the first opening.

2. Apparatus for accurately forming a thin film member of a desired pattern on a substrate, said apparatus comprising: a vacuum chamber, a vapor source mounted in one location within said chamber, said vapor source having a virtual width appreciably greater than its actual width, a substrate mounted in another location within said chamber, a masking member mounted between said substrate and said vapor source and spaced closely apart from said substrate, said masking member being provided with an opening conforming to the desired pattern of said thin film member, and at least one collimating element mounted between and spaced closer to said vapor source than to said masking member, said collimating element being provided with a tapered opening aligned with said vapor source and said opening in said masking member, the opening of said collimating element having surfaces tapered toward said vapor source by an amount sufficient to dispose said surfaces of said tapered opening out of the line of sight of any point along the virtual width of said vapor source.

3. Apparatus for accurately forming a thin film elongated superconductive member on a substrate, said apparatus comprising: a vacuum chamber, a source of superconductive metal vapor mounted within said chamber, said vapor source having a virtual width appreciably greater than its actual width, a substrate within said chamber spaced from said vapor source, a mask mounted adjacent to said substrate and facing said vapor source, said mask being provided with a slit opening corresponding to the configuration of said superconductive member, and at least one collimating element mounted between said vapor source and said mask, said collimating element being provided with an elongated collimating slit registered with the slit opening of said mask and with said vapor source, said collimating slit being longer and wider than the slit opening of said mask, the width of said collimating slit being sufficiently narrow to limit the effective width of said vapor source exposed to said substrate to substantially the actual width of said vapor source, and said collimating slit being tapered in depth by an amount sufficient to dispose the slit surfaces out of the line of sight of any point along the vitual width of said vapor source.

4. Apparatus for accurately forming a plurality of thin film members of desired configuration on a plurality of substrate areas, said apparatus comprising: a vacuum chamber, a vapor source mounted in one location within said chamber, said vapor source having a virtual width appreciably greater than its actual width, means providing a plurality of substrate areas mounted in another location within said chamber, a masking member mounted between said substrate areas, and said vapor source and having a plurality of openings each assigned to a different one of said substrate areas and disposed closely adjacent thereto, each opening conforming to the desired configuration of said thin film members, and collimating means mounted between said source and said masking member for confining vapor particles emitted from said vapor source within a plurality of separate, narrow vapor beams individually assigned to substrate areas exposed through the openings of said masking member, said collimating means comprising a pair of spaced parallel discs provided with elongated slits registered with said vapor source and individual openings of said masking member, the slits nearest said vapor source each having side surfaces inclined at such an angle as to dispose said side surfaces out of the line of sight of any point lying along the virtual width of said vapor source, and the slits nearest said masking member each having side surfaces inclined at such an angle as to dispose the latter side surfaces out of the line of sight of points along the minimum width of the slit nearest said vapor source that is registered therewith.

5. Apparatus for accurately forming a plurality of thin film members of desired configuration on a plurality of substrate areas, said apparatus comprising: a vacuum chamber, a vapor source mounted in one location within said chamber, said vapor source having a virtual width appreciably greater than its actual width, means providing a plurality of substrate areas mounted in another location within said chamber, a masking member mounted between said substrate areas and said vapor source and having a plurality of openings each assigned to a different one of said substrate areas and disposed closely adjacent thereto, each opening conforming to the desired configuration of said thin film members, and collimating means mounted between said source and said masking member for confining vapor particles emitted from said vapor source within a plurality of separate, narrow vapor beams individually assigned to substrate areas exposed through the openings of said masking member, said collimating means comprising two longitudinally spaced collimating elements provided with tapered openings aligned with said vapor source and individual openings of said masking member, the tapered openings nearest said vapor source having surfaces that taper towards said vapor source by an amount sufficient to dispose said surfaces out of the line of sight of any point along the virtual width of said vapor source, and the tapered openings nearest said masking member having surfaces that taper towards said vapor source by an amount sufficient to dispose said last mentioned surfaces out of the line of sight of any point along the minimum width of each tapered opening nearest said vapor source.

6. The invention according to claim 5, wherein said collimating elements are provided with tapered openings in the form of elongated slits.

References Cited in the file of this patent

UNITED STATES PATENTS

| | | |
|---|---|---|
| 2,391,595 | Richards et al. | Dec. 25, 1945 |
| 2,408,529 | Osterberg et al. | Oct. 1, 1946 |
| 2,469,929 | Osterberg et al. | May 10, 1949 |
| 2,614,525 | Haynes | Oct. 21, 1952 |
| 2,676,114 | Barkley | Apr. 20, 1954 |
| 2,784,115 | Brinsmaid et al. | Mar. 5, 1957 |
| 2,968,723 | Steigerwald | Jan. 17, 1961 |

FOREIGN PATENTS

| | | |
|---|---|---|
| 712,105 | Great Britain | July 21, 1954 |

OTHER REFERENCES

Seraphim et al.: IBM Technical Disclosure Bulletin, vol. 4, No. 10, March 1962.

Holland: "Vaccum Deposition of Thin Films," pp. 397–8, John Wiley & Sons, Inc., 440 Fourth Ave., N.Y., 1956.

UNITED STATES PATENT OFFICE

CERTIFICATE OF CORRECTION

Patent No. 3,117,025 January 7, 1964

Arthur J. Learn et al.

It is hereby certified that error appears in the above numbered patent requiring correction and that the said Letters Patent should read as corrected below.

Column 8, line 26, strike out "masking member", second occurrence; line 72, for "vitual" read -- virtual --; column 9, line 24, strike out "having", second occurrence.

Signed and sealed this 2nd day of June 1964.

SEAL)
Attest:

:RNEST W. SWIDER
ttesting Officer

EDWARD J. BRENNER
Commissioner of Patents